United States Patent Office 3,344,168
Patented Sept. 26, 1967

3,344,168
N,N-DIETHYL-2-AMINOETHYL 2-SUBSTITUTED
OXYISOBUTYRATE
Paolo Galimberti, Pavia, Vittorina Gerosa and Max Marcello Melandri, Milan, and Annibale Buttini, Pavia, Italy, assignors to Società Italiana Prodotti Schering, Milan, Italy
No Drawing. Filed June 28, 1963, Ser. No. 291,297
Claims priority, application Great Britain, July 11, 1962, 26,683/62
9 Claims. (Cl. 260—468)

This invention is concerned with new pharmacological agents and the preparation thereof. More particularly, the compounds with which this invention is concerned are aminoesters of the generic formula:

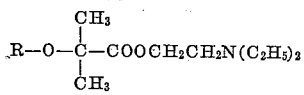

and their hydrohalogenides, in which R represents lower alkyl, cycloalkyl, aralkyl, or aryl radical.

The new aminoesters are extremely useful as choleretic agents. For instance, the compounds of the above formula in which R is phenethyl or cyclohexyl are about twice as active as dehydrocholic acid in this respect. The following table gives the percent increase of bile flux after administration of said compounds to rats in comparison with dehydrocholic acid, all in oral doses of 200 mg./kg., at 20 minutes intervals after administration.

the substances are prepared (M represents an alkali metal):

(a)
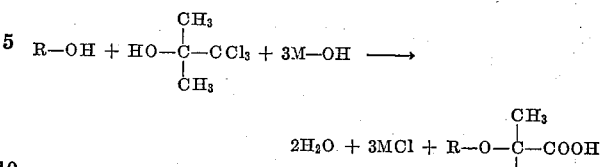

(b)
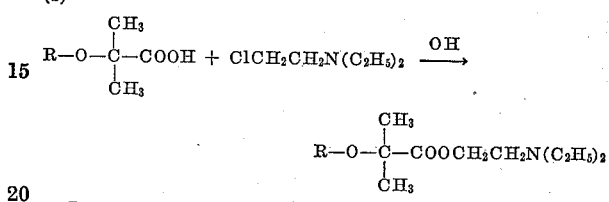

It is intended that the present application encompasses also obvious equivalents of the processes which are above illustrated. However, for the sake of better illustrating the invention the following non-limitative examples are given.

EXAMPLE 1

*Diethylaminoethyl-α-phenethoxyisobutyrate hydrochloride*

To a solution of 112 g. of potassium hydroxide in

| Substance | Minutes after administration | | | | | |
|---|---|---|---|---|---|---|
|  | 20 | 40 | 60 | 80 | 100 | 120 |
| Diethylaminoethyl α-phenethoxyisobutyrate HCl | 56 | 83 | 117 | 106 | 95 | 83 |
| Diethylaminoethyl α-cyclohexyloxy-isobutyrate HCl | 25 | 67 | 42 | 71 | 62 | 8 |
| Na dehydrocholate | 100 | 115 | 40 | 5 | 5 |  |

The compounds show a very low degree of toxicity and are therefore safe for therapeutic use.

The $LD_{50}$ is always much higher than the therapeutic doses. The above two derivatives have an $LD_{50}$ over 2,500 mg./kg. orally and over 1,500 mg./kg. intraperitoneally in rats.

The preparation of the new compounds starts from the substance commercially known as "acetone-chloroform," i.e. 1,1-dimethyl-2-trichloroethanol, which is refluxed with an excess of the appropriate alcohol of the formula R—OH, in which R has the significance given above for the generic formula of the end products, in the presence of an alkali metal hydroxide. The selected alcohol acts also as a solvent. Alternatively, acetone-chloroform may be formed in situ. In this case acetone is used also as the solvent, and to the selected alcohol a slight excess over one equimolecular amount of chloroform is slowly added in the presence of about 5 molar equivalents of an alkali metal hydroxide.

The product obtained by either of the two procedures is then reacted by known methods with diethylaminoethyl chloride giving the end compounds. The following is a reaction scheme illustrating the steps through which 60 ml. of water and 250 ml. of 2-phenethyl alcohol, a solution of 133.2 g. of acetone-chloroform in 200 ml. of 2-phenethyl alcohol is slowly added with external cooling. The mixture is then refluxed for 2 hours, cooled, the precipitated KCl is filtered off and the filtrate is extracted with water. The water layer is extracted with ethyl ether, the organic solvent is discarded and the water layer is made acidic to Congo red by the addition of hydrochloric acid.

After extraction with ethyl ether, the organic layer is evaporated to dryness giving α-phenethoxy-isobutyric acid as a colourless oil which is used as such for the subsequent reaction. To a solution of 5.6 g. of potassium hydroxide and 21 g. of the above obtained oil in 600 ml. of anhydrous ethanol, 14 g. of diethylamino-ethyl chloride are gradually added with stirring. The mixture is refluxed for 3 hours, then the precipitated KCl is filtered off and the solvent is evaporated in vacuo. The residue is dissolved in ethyl ether and hydrogen chloride is bubbled in to complete precipitation. The collected crystals of diethylaminoethyl α-phenethoxyisobutyrate hydrochloride have M.P. 96–97° C.

EXAMPLES 2 TO 4

By the same process as described in Example 1 the following derivatives are prepared:

(2) Diethylaminoethyl α-n-octyloxyisobutyrate HCl, M.P. 70–72° C.
(3) Diethylaminoethyl α-(1-phenylpropyloxy)-isobutyrate HCl, M.P. 81–83° C.
(4) Diethylaminoethyl α-cyclohexyloxyisobutyrate HCl, M.P. 104–106° C.

EXAMPLE 5

To a mixture of 78 g. of 2-phenethyl alcohol, 700 ml. of acetone and 12.8 g. of sodium hydroxide, 90 g. of chloroform are added over a period of 5 hours under stirring and with external cooling. After 2 hours at room temperature the precipitate is filtered off and the solvent is removed by distillation. The residue is taken up with water, washed with ethyl ether and the water layer is made acidic by the addition of hydrochloric acid. The separated oil is extracted with ethyl ether and the solvent is distilled off. The oily residue (48 g.) formed by α-phenethoxy-isobutyric acid, is used for the subsequent step, which is carried out substantially as described in Example 1.

EXAMPLE 6

*Diethylaminoethyl p-biphenylyloxy-isobutyrate hydrochloride*

To a mixture of 170 g. of 4-phenylphenol, 100 ml. of acetone and 200 g. of sodium hydroxide, 144 g. of chloroform are gradually added with stirring under external cooling. The mixture is then heated for 4 hours on a steam bath, after which the solvent is distilled off, the residue is taken up with water and extracted with ethyl ether. The water layer is made acidic by the addition of dilute hydrochloric acid and the precipitate is collected and recrystallised from 80 percent ethanol. Yellow crystals of p-biphenylyloxy-isobutyric acid, M.P. 167–168° C.

To a mixture of 56 g. of potassium hydroxide, 600 ml. of anhydrous ethanol and 256 g. of p-biphenylyloxy-isobutyric acid, 136 g. of diethylaminoethyl chloride are gradually added, then the mixture is refluxed for 3 hours. After cooling, the precipitate of potassium chloride is filtered off and the solvent is removed by distillation. The residue is dissolved in ethyl ether and hydrogen chloride is bubbled in to complete precipitation. The product is collected and dried. M.P. 145° C.

EXAMPLES 6 TO 8

By the same process as described in Example 5 the following products are prepared:

Diethylaminoethyl (2-isopropyl-5-methylphenoxy)-isobutyrate HCl, M.P. 133–134° C.
Diethylaminoethyl (2-methyl-5-isopropylphenoxy)-isobutyrate HCl, M.P. 141–142° C.
Diethylaminoethyl (2-methoxy-4-allylphenoxy)-isobutyrate HCl, M.P. 112° C.

We claim:
1. A compound selected from the group consisting of a diethylamino-ethyl ester of the formula:

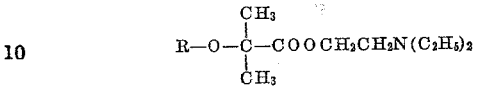

in which R is a member of the class consisting of lower alkyl, phenethyl, 1-phenyl propyl, cyclohexyl, and phenyl substituted by one or two members independently selected from the group consisting of phenyl, methyl, isopropyl, allyl and methoxy, and mineral acid salts thereof.

2. Diethylaminoethyl - α - phenethoxyisobutyrate hydrochloride.
3. Diethylaminoethyl - α - n - octyloxyisobutyrate hydrochloride.
4. Diethylaminoethyl - α - (1 - phenylpropyloxy) - isobutyrate hydrochloride.
5. Diethylaminoethyl - α - cyclohexyloxyisobutyrate-hydrochloride.
6. Diethylaminoethyl - p - biphenylyloxyisobutyrate-hydrochloride.
7. Diethylaminoethyl - (2 - isopropyl - 5 - methylphenoxy)-isobutyrate-hydrochloride.
8. Diethylaminoethyl - (2 - methyl - 5 - isopropylphenoxy)-isobutyrate-hydrochloride.
9. Diethylaminoethyl - (2 - methoxy - 4 - allylphenoxy)-isobutyrate-hydrochloride.

References Cited

UNITED STATES PATENTS

| | | | |
|---|---|---|---|
| 2,265,185 | 12/1941 | Miescher et al. | 260—468 |
| 2,428,978 | 10/1947 | Martin et al. | 260—473 |
| 2,525,249 | 10/1950 | Weizmann | 260—484 XR |
| 3,131,195 | 4/1964 | Rumpf et al. | 260—473 XR |

FOREIGN PATENTS

| | | |
|---|---|---|
| 1,303,154 | 7/1962 | France. |
| 860,303 | 2/1961 | Great Britain. |

OTHER REFERENCES

Buttini, et al.: "Boll, Chim. Farm," 101 May (1962), pp. 354–363.
Galmberti et al.: "Gazzetta Chimica Italiana," vol. 77 (1947), pp. 431–438.
Long et al.: "J. of Pharmacology and Experimental Therapeutics," vol. 120 (1957), pp. 46–51.

LORRAINE A. WEINBERGER, *Primary Examiner.*
R. K. JACKSON, *Assistant Examiner.*